United States Patent Office 3,492,788
Patented Feb. 3, 1970

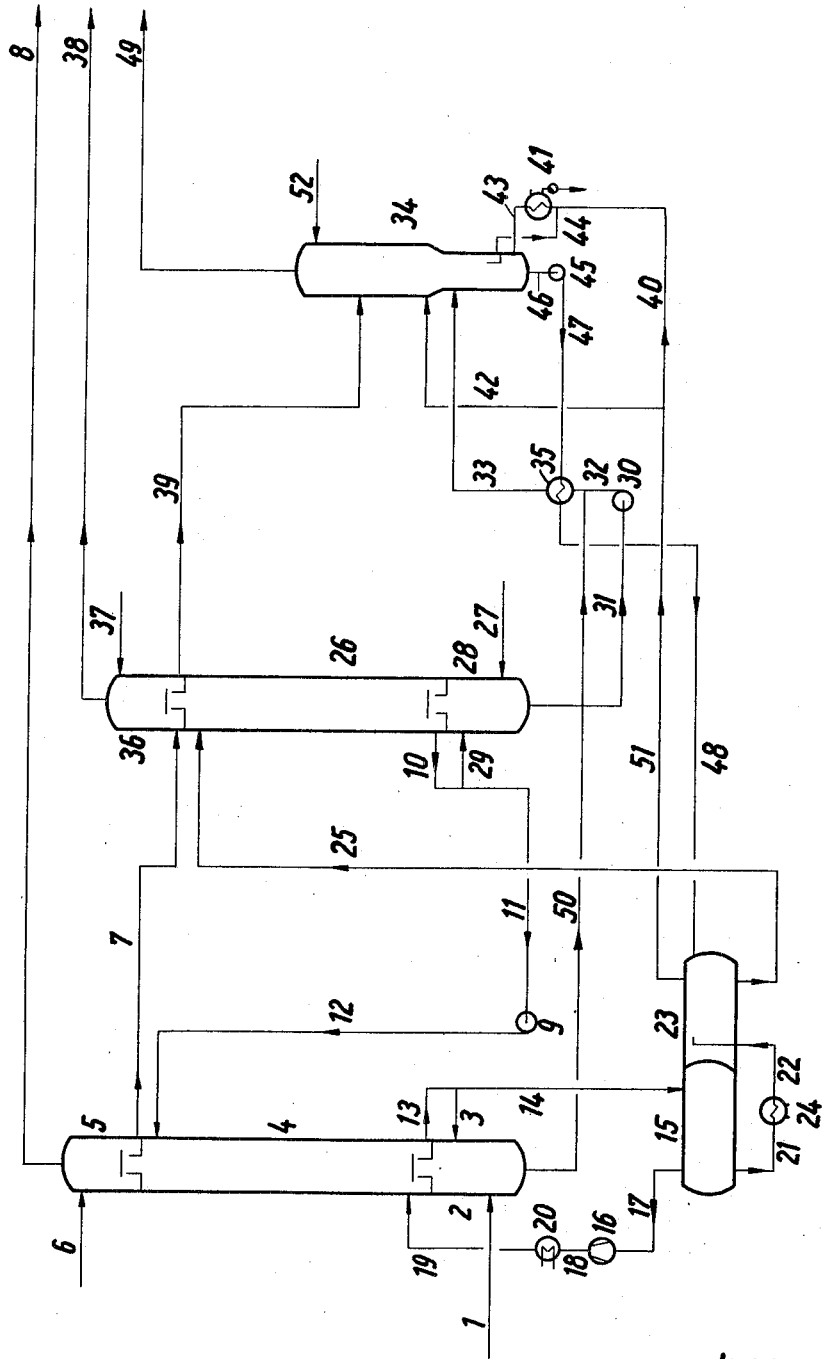

3,492,788
PROCESS OF SEPARATING SOLVENT VAPOR AND WATER VAPOR FROM GASES IN SCRUBBING PROCESSES USING A LIQUID ORGANIC ABSORBENT
Gerhard Hochgesand, Neu-Isenburg, and Herbert Unland, Lorsbach, Taunus, Germany, assignors to Metallgesellschaft Aktiengesellschaft, Frankfurt am Main, Germany
Filed Feb. 28, 1969, Ser. No. 803,265
Claims priority, application Germany, Oct. 5, 1968, 1,801,539
Int. Cl. B01d 50/00, 53/14
U.S. Cl. 55—48     3 Claims

ABSTRACT OF THE DISCLOSURE

The organic solvent used to absorb impurities in a gas is recovered and used to scrub water vapor from gases entering the process and the absorbent vapor is scrubbed by water from the gas streams discharged from the process. The solvent containing water and water containing solvent from said scrubbing steps are jointly processed in a distillation unit from which pure absorbent is recovered as bottoms.

---

Organic solvents having a low volatility and a boiling point which is higher than that of water are used in scrubbing processes for an absorption of hydrogen sulphide, carbon dioxide, carbon oxysulphide and other impurities from pressurized gases. The absorbed gases are expelled from the laden absorbent by regeneration so that the absorbent can be re-used for absorption.

To regenerate the laden solvent, it is flashed in one or more stages to atmospheric or subatmospheric pressure and is subsequently subjected to a stripping treatment with steam, inert gas, or air.

For a stripping treatment with steam, the solvent must be heated to higher temperatures and this may result in incipient decomposition, particularly of high-boiling solvents. This decomposition results in a continuous loss of solvent and necessitates a continuous purification at least of a partial stream of the solvent.

For this reason, considerable advantages are obtained in many cases if an inert stripping gas is used for the regeneration. This regeneration can be carried out at ambient or slightly elevated temperature and under atmospheric or superatmospheric pressure and without need to flash the absorbent solution which has been laden under pressure. The stripping inert gas must be dry for this purpose to avoid a constant ingress of water vapor into the absorbent.

Water vapor is also introduced in most cases during the absorption treatment by the crude gas to be purified.

Another disturbing feature which accompanies the scrubbing of gas with an organic solvent resides in that absorbent vapor is entrained by the pure gas which is discharged from the absorption column and by the exhaust gases from the flashing regeneration unit or stripping regeneration unit. This vapor must be recovered from these gases in most cases because it is undesirable during the further use of the pure gas and of the exhaust gases from the regeneration unit, or because the solvent is so expensive that such solvent losses are economically intolerable.

The purification of gases in continuous operation and under constant process conditions by an absorption of the impurities by a high-boiling solvent, which has a physical dissolving effect and is preferably miscible with water, involves some apparently minor objects, namely, the maintenance of a constant, low concentration of water in the absorbent, the removal of water vapor from the gases which enter the process, and the removal of solvent vapor from the gases which are discharged from the process.

It is known to remove the volatile constituents of the absorbent from the exhaust gases of a scrubbing unit by cooling and/or by scrubbing the gases with a suitable solvent such as water.

It is known to remove part or all of the moisture from crude gases by a treatment with solid adsorbents or liquid absorbents before the gases enter a scrubber.

It is also known that an absorbent which has a physical dissolving effect and has been laden under pressure can be substantially regenerated by flashing it to atmospheric or subatmospheric pressure whereas only a partial stream of the partly regenerated absorbent is subjected to a fine regenerating treatment, and in which the absorbent is stripped with inert gas or steam, possibly in conjunction with heating. The absorbent can also be distilled from higher-boiling impurities.

It has been found that the apparently heterogeneous objects to remove water vapor from the gases which enter the process and to remove absorbent vapor from the gases which are discharged from the process can be jointly accomplished in a simple manner in that the gases which enter the process are scrubbed with absorbent in preceding separate stages and the gases which are discharged from the process are scrubbed with water in separate after-scrubbing stages and the liquid effluents from these scrubbing stages are combined and separated into absorbent and water.

This separation is preferably carried out in a distillation column, in which the exhaust gas from the flashing regeneration unit is used as a stripping fluid after it has been heated. This exhaust gas is free of water and contains absorbent.

The object of this invention is to produce a process for purifying industrial gases, in which the impurities contained in the gases are absorbed under pressure by a high-boiling organic solvent which is miscible with water and which is regenerated by being flashed and/or by being stripped with an inert gas and is subsequently returned to the absorption unit.

In general, this object is obtained in that the water vapor is scrubbed by the absorbent from the gas streams which enter the process, the absorbent vapor is scrubbed by water from the gas streams which are discharged from the process, and the absorbent-water mixtures drained from these scrubbing stages are jointly processed in a distillation unit, and in which exhaust gas from the flashing regeneration unit is used as a stripping fluid and from which pure absorbent is recovered as bottoms.

The exhaust gas from the flashing unit, which gas is used as a stripping fluid in the distillation column, is heated for this purpose and is introduced into the bottom part of the column, for example, through the reboiler of the recirculation system of the distillation column. The stripping distillation column is provided with elements which promote an exchange of material, such as plates or packings, and is divided into zones by lateral supply conduits. Water is supplied to the top of the column so that solvent vapor is scrubbed from the stripping gas in the uppermost zone. The next lower zone is laterally supplied with the solvent-containing water which has been used to scrub the gas streams which leaves the process. The lowermost zone disposed directly over the sump is laterally supplied with the water-containing solvent which has been used to scrub the gasses which enter the process. That portion of the exhaust gas from the flashing regeneration unit which is not used as a stripping fluid may be laterally supplied into the stripping column at a point which lies between the two last-mentioned lower lateral inlets.

The means by which the objects of this invention are obtained are described more fully with respect to the accompanying drawing which is a flow diagram of a plant by way of example for removing carbon dioxide from gases by a scrubbing process.

The plant consists essentially of an absorption tower 4, a regeneration tower 26, flashing vessels 15, 23 and a distillation column 34. The absorption tower 4 and the regeneration tower 26 are each succeeded by a drying zone 2 or 28 and an after scrubbing zone 5 or 36.

The raw gas to be purified flows through a conduit 1 into a crude gas dryer 2, in which the water vapor contained in the gas is absorbed by part of the laden solvent; that part is supplied through a conduit 3. The partial stream leaves the dryer in a conduit 50.

The almost dry gas then enters the absorption tower 4, where impurities are removed from the gas to the specified residual amount.

The organic solvent vapor which is entrained by the pure gas is removed in the after-scrubbing zone 5, which is operated with water. Scrubbing water is supplied to that zone through conduit 6 and together with the absorbent solvent leaves the zone through conduit 7. Pure gas is discharged from the plant by conduit 8.

The scrubbing fluid which is required to remove the impurities from the gas is supplied by a pump 9 through conduits 10, 11 and 12 to the top of the absorption tower 4, in which it flows in a countercurrent to the gas to be purified and is thus laden.

The laden absorbent which flows through conduits 13 and 14 from the absorption tower 4 enters a flashing vessel 15, where a partial flashing is effected to desorb a major part of the coabsorbed useful gases. The desorbed gases are returned by a compressor 16 through conduits 17, 18 and 19 into the absorber 4. The heat of compression of the gas is extracted in a cooler 20.

The solvent flows from the flashing vessel 15, and conduits 21 and 22 and a cooler 24 into another flashing vessel 23. The cooler 24 serves to extract the surplus heat from the solvent cycle. The gas which has been flashed off in the vessel 23 flows through a conduit 51 to the separation column 34. The solvent which has now been considerably flashed is conducted through a conduit 25 to the stripping tower 26.

The solvent is flashed once more at the top of the regeneration tower 26. The residual solute is stripped from the solvent by an inert gas, which is introduced through a conduit 27 into the stripping gas dryer 28 and from the latter enters the regeneration tower 26. The pump 9 supplies the regenerated solvent from the bottom of the regeneration tower 26 through the conduits 10, 11 and 12 back to the top of the absorption tower.

To dry the stripping gas, a partial stream of the regenerated solvent is passed through a conduit 29 into the stripping gas dryer 28. The partial stream of solvent which is laden with the water vapor from the stripping gas is supplied by a pump 30 through conduits 31, 32 and 33 and a heat exchanger 35 into the separation column 34. The partial stream of solvent from the stripping gas dryer and the solvent stream flowing through conduit 50 from the crude gas dryer 2 are combined in con- 32 and are subsequently heated in the heat exchanger 35 in a countercurrent to the solvent which flows back from the separation column 34.

The gas which flows from the regeneration tower 26 is passed through the after-scrubbing zone 36, where it is scrubbed with water to remove solvent vapor which is entrained in the gas, which is subsequently discharged from the plant through conduit 38. The water is supplied through the conduit 37 by the after-scrubbing zone 36 and at the bottom of said zone is combined with the solvent-containing water which flows through the conduit 7 from the after-scrubbing zone 5 succeeding the absorption tower 4. The combined partial streams are passed through a conduit 39 to the separation column 34.

The solvent contained in the exhaust gas from the second flashing vessel 23 is recovered in the separation column 34, in which the water content of the solvent-$H_2O$ mixtures supplied to the column is reduced to the desired value so that the water vapor which has entered with the crude and stripping gases is removed from the process.

A partial stream of the flashed-off gas supplied through conduit 51 is passed through conduit 40 into the reboiler 41 at the bottom of the stripping distillation column 34. The balance is laterally supplied into the column by a conduit 42. The gas is discharged from the column through conduit 49.

The separation column is provided with plates and divided into a plurality of zones. The uppermost zone is supplied with solvent-free water through a conduit 52 to remove residual solvent in said zone from the exhaust gas flowing through the separation column. The second scrubbing zone lies between the connections of the conduits 39 and 42. The exhaust gas flowing into the separation column is scrubbed in that zone with all water supplied through conduits 39 and 52.

The lowermost zone of the separation column is positioned under the connection of conduit 42. In that zone, the water content of the solvent partial streams coming from the gas dryers 2 and 28 and supplied through conduit 33 is reduced to the desired size.

Part of the exhaust gas is introduced by the conduit 40 and the reboiler 41, which is connected by conduits 43 and 44 to the bottom of the separation column 34. The flow rate of this exhaust gas is selected so that the gas flowing through the reboiler 41 can absorb vapor from the concentrated solvent at a relatively low boiling temperature in an amount which melts the heat requirements of the column 34. The gas lowers the partial pressure of the solvent. The gas-vapor mixture which enters the column 34 from conduit 43 serves to expel surplus water from the absorbent partial streams which enter the lower zone of the column 34 through the conduit 33.

When the scrubbing agent has been concentrated to the desired water content, it is transferred from the bottom of the column 34 by the pump 45 through conduits 46, 47 and 48 into the absorbent cycle, which comprises the absorption tower 5, 4 and the regeneration tower 26. The scrubbing agent is cooled in the heat exchanger 35, in which it flows in a countercurrent to the liquid stream entering the column 34 through conduit 33.

The difference between the rate of the water vapor which is contained in the gases that enter the plant and are discharged from it, respectively, determines the rate at which scrubbing water is available for removing solvent from the pure gas in the after-scrubbing zone 5 and from the exhaust gases in the after-scrubbing zone 36 and the column 34. Those rates at which said water is supplied through conduits 6 and 37 to the scrubbing units 5 and 36 that are operated with water should be as small as possible and are normally determined by the minimum liquid space velocities of said units. The remainder of the required water flow rate is supplied through conduit 52 to the stripping distillation column 34.

When the crude gas and the stripping gas contain only a small amount of water vapor, the drying zones 2 and 28 may be eliminated. To this end, the overflow plates and the branch conduits 3, 29 are omitted. The water vapor is then absorbed in the absorption tower and in the stripping tower and in an absorbent partial stream branched, for example, from conduit 11, is supplied through the heat exchanger 35 and the conduit 33 to the separation column 34.

EXAMPLE

For a recovery of crude hydrogen, carbon dioxide is to be removed by scrubbing from a cracked gas which has been produced by cracking liquid hydrocarbons with oxygen and steam and in which the carbon monoxide content has been converted into carbon dioxide and hydrogen by a treatment with steam.

The gas consisted substantially of hydrogen and carbon dioxide and had the following composition on a dry basis:

| | Percentage by volume |
|---|---|
| $CO_2$ | 0.1 |
| $H_2$ | 64.5 |
| CO | 1.5 |
| $CH_4$ | 0.4 |
| $N_2 + Ar$ | 0.4 |

The gas was under a pressure of 75 ata. (atmospheres absolute pressure) and at a temperature of 40° C.

From this gas at a rate of 110,000 standard cubic meters per hour, gases consisting mainly of carbon dioxide were removed at a rate of 36,800 standard cubic meters per hour by scrubbing with N-methylpyrrolidone, which contained 1% by weight of water. The remaining crude hydrogen at a rate of 73,200 standard cubic meters per hour had the following composition:

| | Percentage by volume |
|---|---|
| $CO_2$ | 0.1 |
| $H_2$ | 96.5 |
| $N_2 + CO + CH_4 + Ar$ | 3.4 |

The residual impurities amounting to 3.5% by volume were removed during subsequent low-temperature fractionation of the gas.

Flashing the laden absorbent to 7 ata. released carbon dioxide at a rate of 20,650 standard cubic meters per hour. The remaining absorbent was further flashed to atmospheric pressure in the stripping regeneration unit, where additional carbon dioxide at a rate of 16,150 standard cubic meters per hour was expelled. To this end, stripping gas at a rate of 4,450 standard cubic meters per hour was introduced into the bottom of the stripping tower.

The gas to be purified, which was supplied at a rate of 110,000 standard cubic meters per hour, introduced water into the absorption tower at a rate of 130 kilograms per hour. This water was absorbed in the drying zone 2 by $CO_2$-laden N-methylpyrrolidone, which had a water content of 1% and flowed at a rate of 10 cubic meters per hour. The stripping gas supplied at a rate of 4,450 standard cubic meters per hour introduced water in the form of moisture at a rate of 80 kilograms per hour into the stripping tower 26. This water was absorbed in the drying zone 28 by regenerated N-methylpyrrolidone having a water content of 1% by weight water and flowing at a rate of 7 metric tons per hour.

The purified gas discharged from the absorption tower contained entrained absorbent vapor at a rate of 5 kilograms per hour. This absorbent vapor was absorbed in the after-scrubbing zone by water supplied at a rate of 157 kilograms per hour. The flashed-off and stripped-off gases and the stripping gas discharged from the stripping tower contained entrained absorbent vapor at a rate of 48 kilograms per hour. This absorbent vapor was absorbed in the after-scrubbing zone 36 by water supplied at a rate of 206 kilograms per hour.

The separation column 34 was supplied with water at a rate of 380 kilograms per hour contained in water-containing absorbent coming at a rate of 17.21 metric tons per hour from the drying zones 2 and 28 through conduits 50, 31 and 32, 33.

The separation column 34 was supplied with liquid at a rate of 416 kilograms per hour through the conduits 7 and 39 from the drying zones 5 and 36. This liquid consisted of water at a rate of 363 kilograms per hour and absorbent at a rate of 53 kilograms per hour.

A temperature of 120° C. was maintained in the sump of the separation column 34 by the reboiler 41. Exhaust gas at a rate of 20,650 standard cubic meters per hour was discharged from the second stage 23 of the flashing regeneration unit. Part of this exhaust gas was passed at a rate of 9,050 standard cubic meters per hour through the reboiler 41 and the conduits 40 and 43 together with the liquid which was recirculated through the sump of the separation column. The remainder of the exhaust gas was introduced at a rate of 11,600 standard cubic meters per hour through the conduit 42 into the separation column on an intermediate level between the supply conduits 39 and 33.

Water which had been freed from salt (condensate) was charged from conduit 52 to the top of the separation column at a rate of 690 kilograms per hour.

Gas at a rate of 20,650 standard cubic meters of gas and 1,263 kilograms water vapor at a temperature of 40° C. was discharged per hour from the top of column 34 and contained only 1 kilogram absorbent vapor.

Because the laden absorbent was regenerated by flashing and by stripping with an inert gas at ambient temperature or a slightly elevated temperature, the plant had a comparatively low heat requirement. External heat was required only in the separating column 34 at a rate of 910,000 kcal./h. Steam was required in the reboiler 41 as saturated steam under a pressure of 3 ata. at a rate of 1.8 metric tons per hour.

Having now described the means by which the objects of this invention are obtained, we claim:

1. A process for purifying industrial gases comprising absorbing the impurities contained in the gases in an absorption unit by an absorbent composed of a high boiling organic solvent under pressure and which is miscible with water, regenerating said organic solvent by flashing or stripping with an inert gas in a flashing unit, returning said organic solvent to the absorption unit, and further comprising scrubbing the water vapor from the gas streams entering the process by the absorbent, scrubbing the absorbent vapor by water from the gas streams discharged from the process, and jointly processing the absorbent-water mixtures drawn from the scrubbing processes in a distillation unit in which exhaust gas from the flashing unit is used as a stripping fluid and from which pure absorbent is recovered as bottoms.

2. A process as in claim 1, further comprising heating the exhaust gas from said flashing unit before being used as the stripping fluid.

3. A process as in claim 1 in which the exhaust gas from the flashing unit leaves the distillation unit at a temperature only slightly higher than the ambient temperature.

References Cited

UNITED STATES PATENTS

| 3,324,627 | 7/1967 | Kohrt | 55—51 |
| 3,375,639 | 4/1968 | Miller et al. | 55—48 |
| 3,435,590 | 4/1960 | Smith | 55—48 |

REUBEN FRIEDMAN, Primary Examiner

C. N. HART, Assistant Examiner

U.S. Cl. X.R.

55—68